(12) United States Patent
Yingst

(10) Patent No.: US 8,818,953 B2
(45) Date of Patent: Aug. 26, 2014

(54) METHOD AND APPARATUS FOR LOADING DATA INTO MULTI-TABLE TABLESPACE

(75) Inventor: Patricia L. Yingst, Austin, TX (US)

(73) Assignee: BMC Software, Inc., Houston, TX (US)

(*) Notice: Subject to any disclaimer, the term of this patent is extended or adjusted under 35 U.S.C. 154(b) by 1576 days.

(21) Appl. No.: 10/998,399

(22) Filed: Nov. 29, 2004

(65) Prior Publication Data

US 2006/0117029 A1 Jun. 1, 2006

(51) Int. Cl.
*G06F 17/00* (2006.01)
*G06F 7/00* (2006.01)
*G06F 17/30* (2006.01)

(52) U.S. Cl.
CPC ............................. *G06F 17/30365* (2013.01)
USPC .......................................... 707/643; 707/640

(58) Field of Classification Search
USPC ............ 707/1–10, 100–104.1, 200–205, 640, 707/643
See application file for complete search history.

(56) References Cited

U.S. PATENT DOCUMENTS

| | | | | |
|---|---|---|---|---|
| 5,579,515 A | * | 11/1996 | Hintz et al. | 707/7 |
| 5,887,274 A | * | 3/1999 | Barry et al. | 707/202 |
| 6,163,783 A | * | 12/2000 | Hintz et al. | 707/201 |
| 2005/0055351 A1 | * | 3/2005 | Barton et al. | 707/10 |
| 2005/0198074 A1 | * | 9/2005 | Khayter et al. | 707/104.1 |

* cited by examiner

*Primary Examiner* — Hosain Alam
*Assistant Examiner* — Navneet K Ahluwalia

(57) ABSTRACT

A relational database load operation is disclosed for loading data into a multi-table tablespace, such as a segmented tablespace in a DB2® environment. In one aspect, the load operation allows one or more tables to be replaced in a single pass of the tablespace without modifying, loading or replacing other tables in the tablespace. Thus, the disclosed operation can replace one or more tables in a single pass of the tablespace without the need to unload and reload tables not targeted for replacement. In another aspect, the load operation allows for a combined operation where one or more tables are replaced and one or more tables are resumed in a single pass of the multi-table tablespace without modifying other tables already residing in the tablespace.

54 Claims, 10 Drawing Sheets

DETAIL OF SPACEMAP PAGE 1

| | NEXT SEG | TABLE ID | FLAG | PG | PG | PG | PG |
|---|---|---|---|---|---|---|---|
| 1 | 003 | 0001 | C0 | F | F | F | F |
| 2 | 429 | 0002 | C0 | F | F | F | F |
| 3 | 428 | 0001 | 80 | R | R | F | F |
| 4 | 005 | 0003 | C0 | R | R | R | R |
| 5 | 006 | 0003 | 80 | F | F | F | F |
| ⋮ | ⋮ | ⋮ | ⋮ | ⋮ | ⋮ | ⋮ | ⋮ |
| 427 | 540 | 0003 | 00 | F | F | F | F |
| 428 | 000 | 0001 | 80 | F | F | F | F |

FIG. 6B

F = FULL
E = EMPTY
R = ROOM FOR ROW

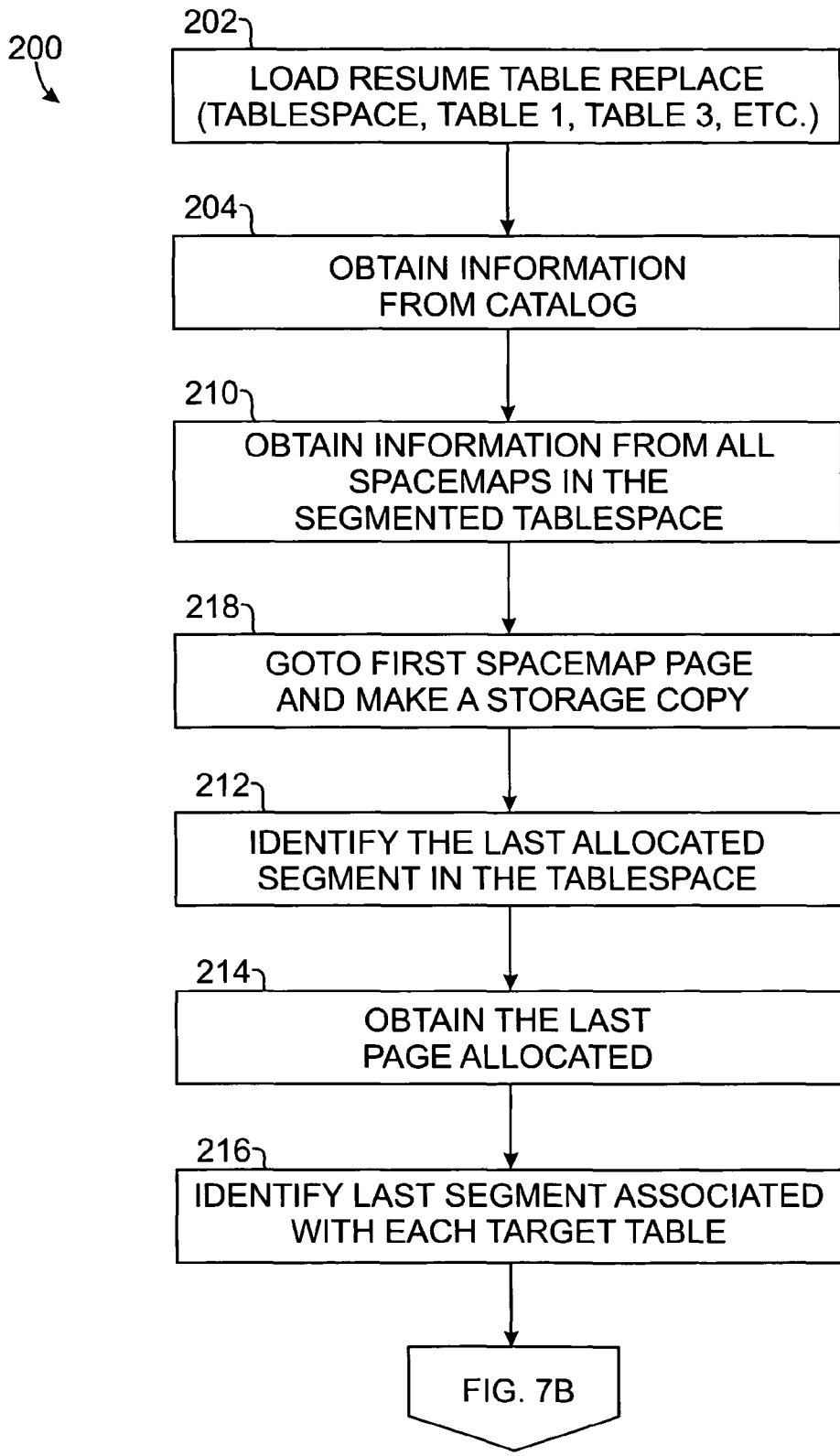

METHOD AND APPARATUS FOR LOADING DATA INTO MULTI-TABLE TABLESPACE

FIELD OF THE INVENTION

The subject matter of the present disclosure generally relates to a database system and, more particularly but not by way of limitation, to methods and apparatus for loading data into a multi-table tablespace of a relational database system.

BACKGROUND OF THE INVENTION

Fundamentally, a database is a computerized record-keeping system in which large amounts of information may be stored in a structured manner for ease of subsequent retrieval and processing. Large databases are generally managed through data base management systems (DBMS's). A DBMS provides an operational environment through which a user may retrieve or update previously stored information. In one type of DBMS, referred to as a relational database system, information is stored in tables, with each table having one or more columns and one or more rows. Each column in a table is referred to as an attribute of the table. Each row in a table is referred to as a record. Thus, a table typically comprises a plurality of records (rows), each of which has a plurality of attributes (columns). By way of example, a business might maintain a database of employee information. In this example, each record may be associated with an employee, and the attributes of each record can identify information such as the employee's name, social security number, address, employee number, department, position, salary, hire date and any other information the business deems useful.

One well-known example of a relational database system is the DB2® database environment. (DB2® is a registered trademark of International Business Machines Corporation of Armonk, N.Y.). Within a DB2® environment, database tables are created within a tablespace. One type of tablespace within the DB2® environment is a segmented tablespace, which may contain more than one DB2 table. The segments are data structures or groups of pages that hold rows of a single table so that rows of different tables are not stored in the same segment. A page is a data structure or a unit of storage within the tablespace. The size of the pages is determined at tablespace creation and may be specified as 4K, 8K, 16K, or 32K, for example.

In a DB2® environment, there often is a need to load large amounts of data into DB2® tables. For example, data is loaded to initially populate a table, to periodically replace the data in a table, to periodically add data to a table, or to reload data into a table. This data can originate from a variety of sources, such as other DB2® tables (possibly from a different DB2® system) or other database management systems (DBMSs), including IMS or distributed-systems DBMS applications that generate sequential files. In many cases, users load millions of rows at a time. Because data in the tablespace is often unavailable to applications during the loading process, the loading process is preferably completed as quickly as possible.

LOAD utilities are known in the art for loading data into a tablespace. DB2® LOAD utilities include those by BMC Software, IBM, Computer Associates and CDB Software, Inc. LOAD utilities load data from a source (typically a sequential file) into one or more tables of a tablespace. If the tablespace already contains data, users can choose to add the new data to the existing data using a LOAD RESUME operation in which rows of new data are added at the end of the already existing data. Alternatively, the user can choose to replace the existing data of the tablespace using a LOAD REPLACE operation in which all the existing data for all tables in the tablespace are replaced by new rows.

Referring FIG. 1, a LOAD RESUME operation according to the prior art is schematically shown performed on a segmented tablespace 10. The RESUME option tells the LOAD utility to add new table data A' to an existing tablespace 10, which may be empty or may already contain table data A. For example, a RESUME NO operation tells the LOAD utility that the tablespace is empty, whereas as RESUME YES operation indicates that the tablespace might or might not be empty. Using LOAD RESUME, the new table data A' is written after the end 12 of the existing tablespace's data, as shown in the resultant tablespace 14.

Referring to FIG. 2, a LOAD REPLACE operation according to the prior art is schematically shown on a segmented tablespace 20. The REPLACE option tells the LOAD utility to delete the existing data before loading—writing over all tables in the tablespace starting at the beginning of the tablespace 20. Therefore, if an existing tablespace 20 has tables A and B and a LOAD REPLACE operation is invoked with new table data A', the LOAD utility loads the new table data A' starting at the beginning of the tablespace and all other data is deleted, as shown in the resultant tablespace 22.

As noted above, users of DB2® databases currently cannot use a LOAD utility to replace some data tables (e.g., a REPLACE operation) and augment other tables (e.g., a resume operation) in a single load job when those tables reside in a common multi-table segmented tablespace. If using a LOAD utility is desirable, the user must unload rows for the unchanging tables and replace the entire tablespace with rows for all desired tables. Alternatively, the user must somehow delete the rows of the target tables and then use a LOAD utility to add the new rows to the tablespace. These prior art techniques are described below.

Referring to FIG. 3A, one prior art technique for replacing a table on a segmented tablespace using a LOAD utility without destroying data of other tables is schematically illustrated. In this technique, the user stores different tables (table A and B) in separate segmented tablespaces 26 and 28. In this way, a LOAD REPLACE operation can be performed against table A in tablespace 26 without affecting table B in tablespace 28. While this approach permits a user to modify and/or replace table data without concern or danger of modifying data in other tables, it is not an efficient use of resources.

Referring to FIG. 3B, another prior art technique is schematically illustrated. In this technique, the user uses structured query language (SQL) commands in a first pass (Pass 1) of the tablespace 30 to delete all the rows of a targeted table (e.g., table A). Then, in a second pass (Pass 2) of the tablespace 30, a LOAD RESUME operation is used on the resultant tablespace 32 to load the new table data A', which is appended to the end 34 of the segmented tablespace, as shown in the resultant tablespace 36. However, this prior art technique requires a number of separate operations and is not an efficient use of resources.

Referring to FIG. 3C, yet another prior art technique is schematically illustrated. In this technique, the user unloads all the data of the tables (e.g., tables A and B) from the tablespace 40 in a first pass (Pass 1) of the tablespace 40. The unloaded table being replaced (e.g., table A) is discarded. Then, in a second pass (Pass 2) of the tablespace 40, the user uses a LOAD REPLACE operation to load the new table data A' and the unchanging table data B into the tablespace, as shown in the resultant tablespace 42. Again, this prior art technique requires a number of separate operations and is not an efficient use of resources.

Therefore, a need exists for a feature that will allow a table or multiple tables to be replaced in a multi-table segmented tablespace without modifying other tables residing in that tablespace. Furthermore, a need exists for a feature that will allow a user to use a LOAD utility to load a pre-existing tablespace replacing all rows in specified tables and adding rows to other tables and that will perform the load in a single pass of the tablespace. The subject matter of the present disclosure is directed to overcoming, or at least reducing the effects of, one or more of the problems set forth above.

SUMMARY OF THE DISCLOSURE

A relational database load operation is disclosed for loading data into a multi-table tablespace. In one aspect, the load operation allows one or more tables to be replaced without modifying other tables in the tablespace in a single pass. In another aspect, the load operation allows one or more tables to be replaced and one or more other tables to be resumed (i.e., augmented) in a single pass of the multi-table tablespace without modifying other tables already residing in the tablespace. When replacing one or more tables of the tablespace, the disclosed operation finds any reclaimable data structures of the tablespace. The reclaimable data structures can include data structures that are de-allocated or that are associated with any of the tables being replaced. When reclaimable data structures are found, the disclosed operation loads replacement data for the targeted tables into the reclaimable data structures. Any reclaimable data structures not loaded with replacement data are de-allocated. Any replacement data not fitting within the found reclaimable data structures is loaded into new data structures added after the existing end of the tablespace. When resuming one or more tables of a multi-table tablespace, the disclosed operation loads resumed data for specified or targeted tables in new data structures added after the existing end of the tablespace.

The foregoing summary is not intended to summarize each disclosed or potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 6B illustrates a portion of an exemplary spacemap for the segmented tablespace of FIG. 6A.

FIGS. 7A-7B illustrate, in flowchart form, a method in accordance with one embodiment of the invention.

Figure 1:
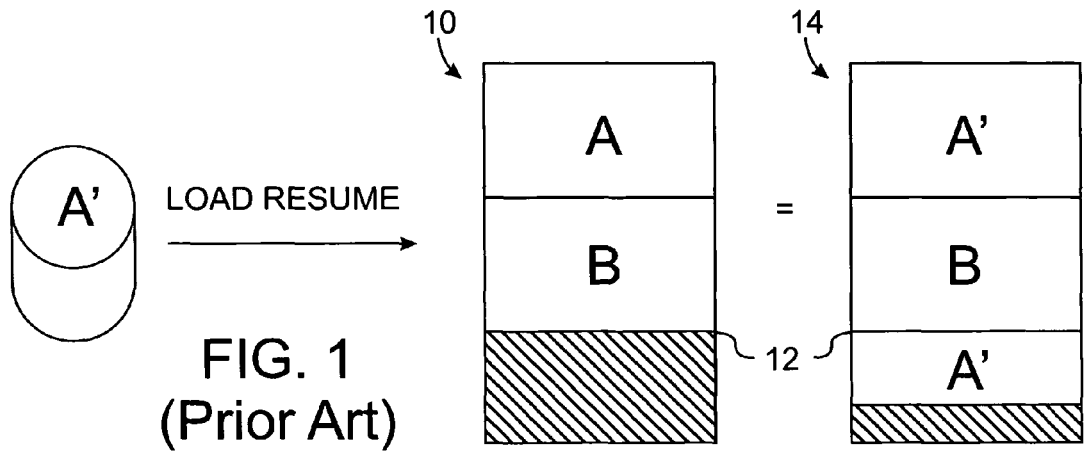
FIG. 1 illustrates a LOAD RESUME operation according to the prior art on a segmented tablespace.
Figure 2:
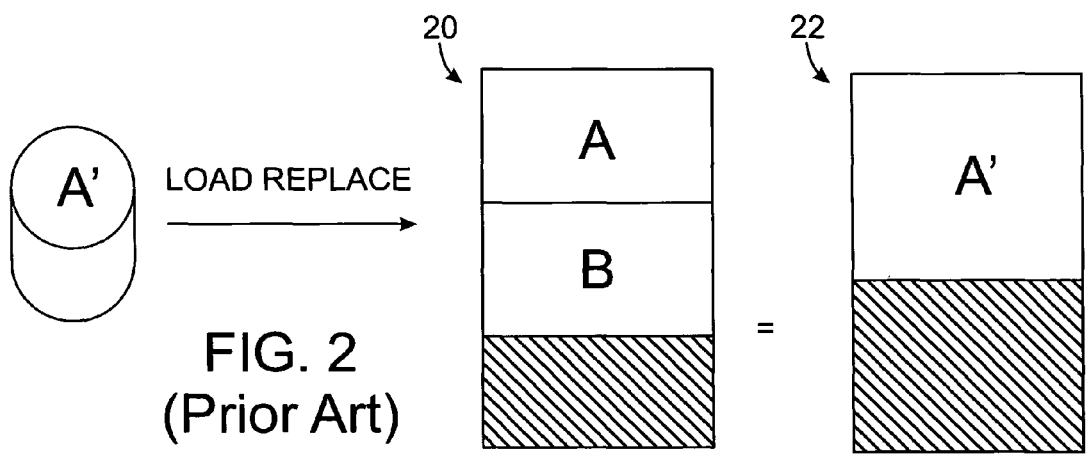
FIG. 2 illustrates a LOAD REPLACE operation according to the prior art on a segmented tablespace.

While the disclosed operation for loading data into a segmented tablespace is susceptible to various modifications and alternative forms, specific embodiments thereof will be shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

In one embodiment, a load operation in accordance with the invention allows one or more tables in a multi-table tablespace to be replaced without modifying other tables in the tablespace in a single pass. As used herein, the phrase "without modifying" generally means that the data in non-targeted tables (i.e., tables whose data is not directly modified in accordance with the invention) remains in place in the tablespace and is not replaced or resumed with itself.

Figure 4A:
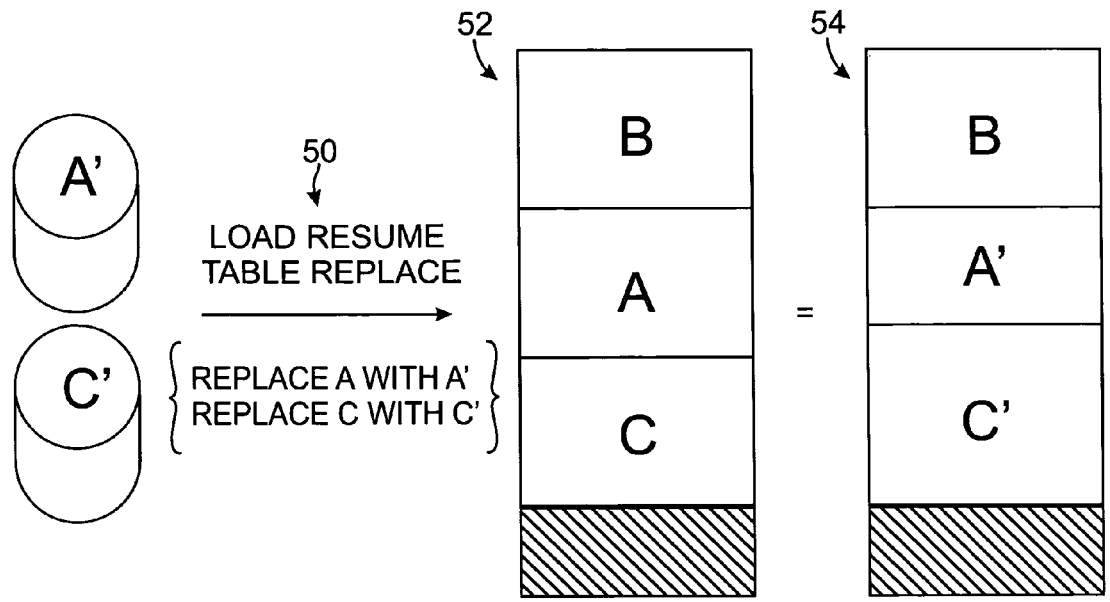
FIG. 4A schematically illustrates an operation in accordance with one embodiment of the invention for loading data into a multi-table tablespace, wherein one or more, but not all, tables in the multi-table tablespace are replaced without affecting the other tables in the tablespace.
Figure 4B:
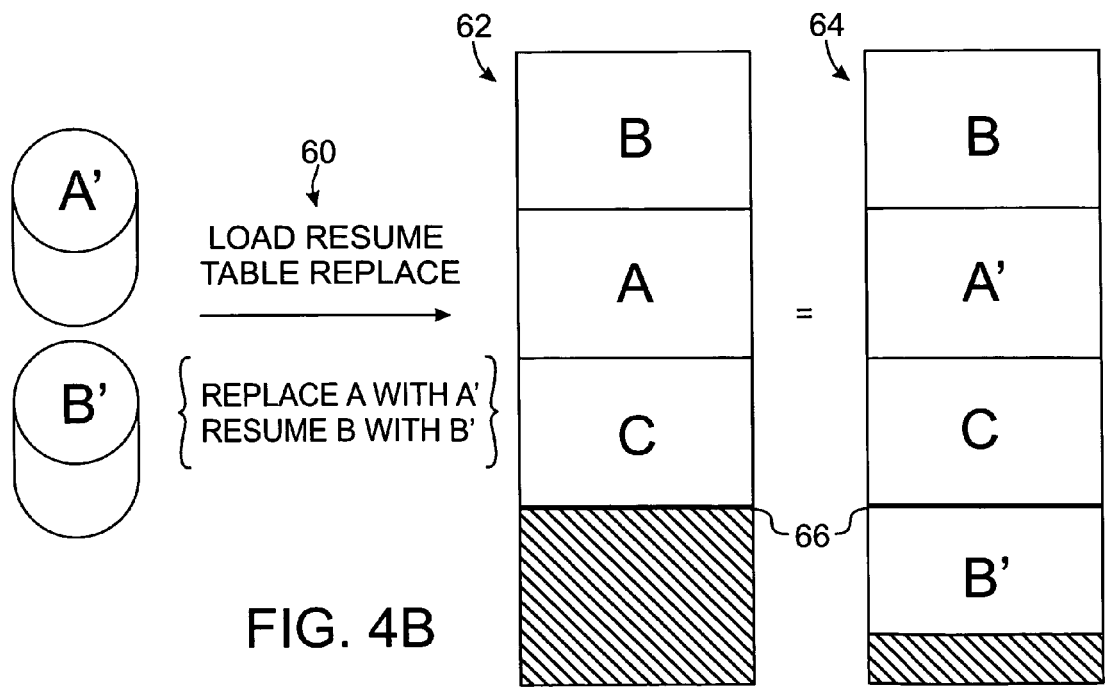
FIG. 4B schematically illustrates another embodiment of the invention wherein one or more tables are replaced and one or more tables are resumed without affecting other tables in a multi-table tablespace.

Referring to FIGS. 4A and 4B, an operation for loading data into a multi-table tablespace in accordance with one embodiment of the invention is shown. In this embodiment, referred to as a LOAD RESUME TABLE REPLACE operation, a DB2® segmented tablespace environment is assumed. One skilled in the art of database management will appreciate, however, that the teachings of the present disclosure are not limited to a DB2® environment or DB2® LOAD utilities. Rather, one skilled in the art of database management will appreciate that the teachings of the present disclosure can relate to other load utilities and relational database systems having tablespaces capable of holding multiple tables.

Figure 3A:
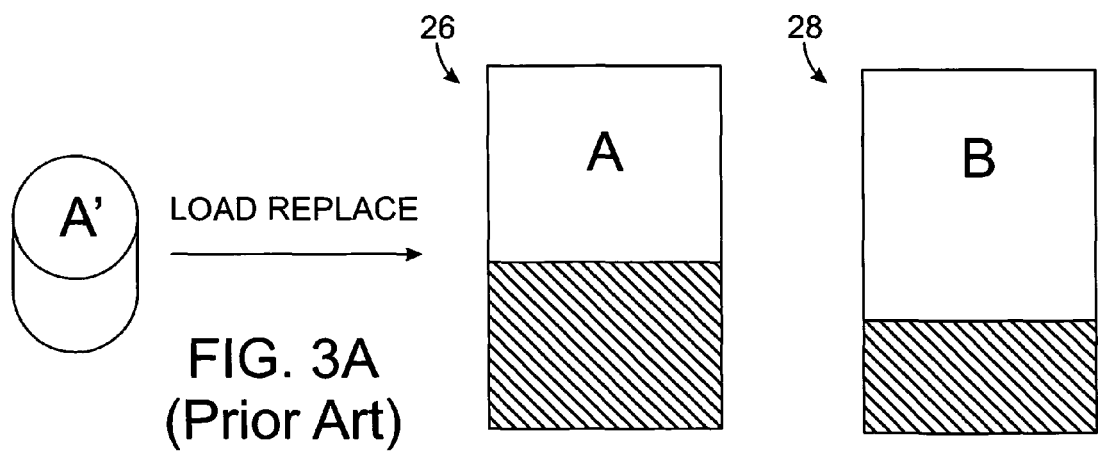
FIG. 3A illustrates a prior art technique for replacing a table in a segmented tablespace without destroying data associated with other tables in the segmented tablespace.
Figure 3B:
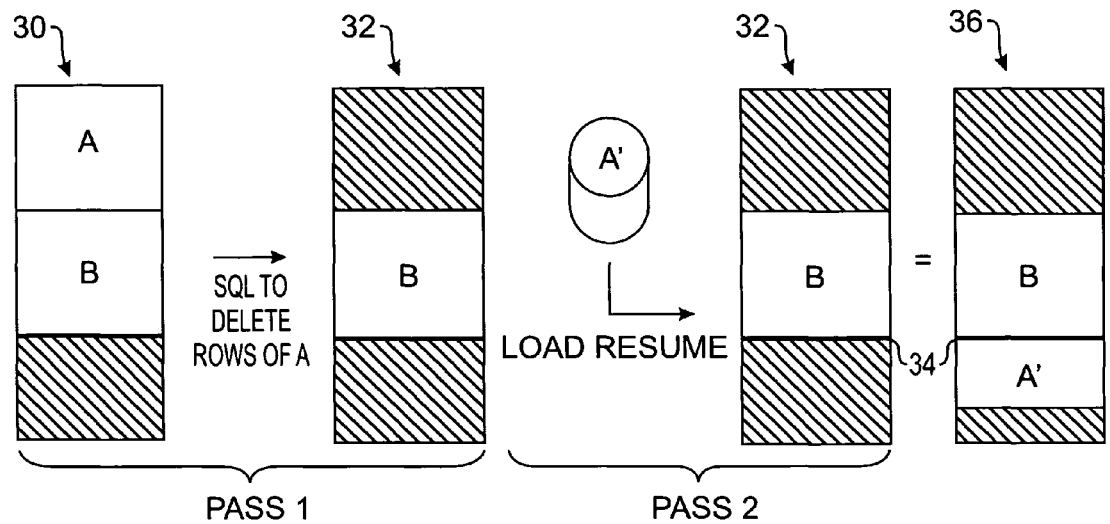
FIG. 3B illustrates another prior art technique for replacing a table in a segmented tablespace without destroying data of other tables.
Figure 3C:
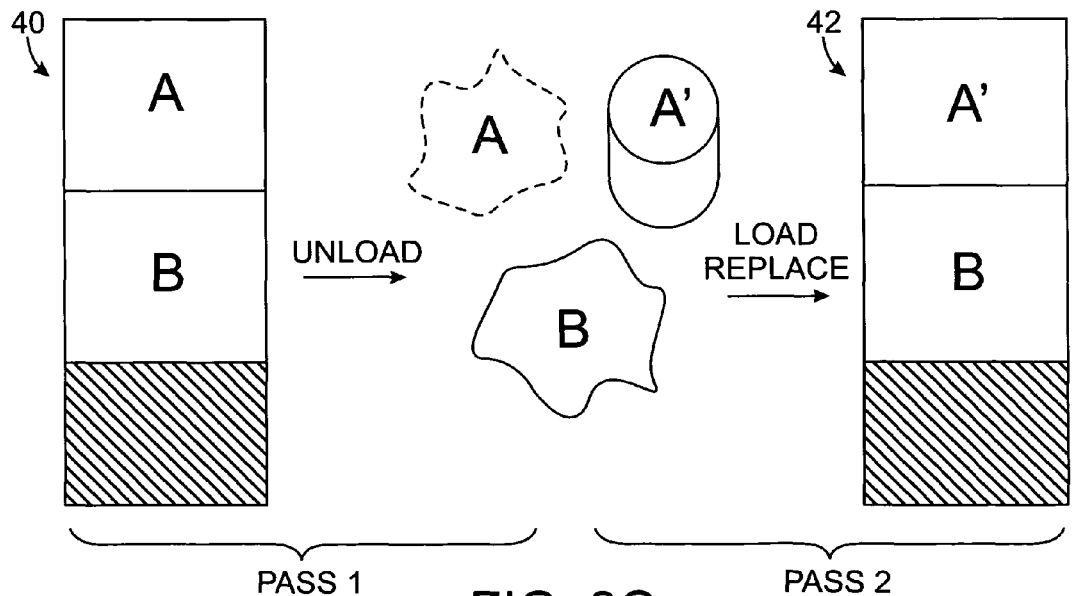
FIG. 3C illustrates yet another prior art technique for replacing a table in a segmented tablespace without destroying data of other tables.

In FIG. 4A, the disclosed operation 50 allows tables A and C in the multi-table tablespace 52 to be replaced with new table data A' and C' without the need to modify, resume, or replace the data of associated with table B in the tablespace 52. During the disclosed operation 50, then, the original data of table B in the original tablespace 52 is not disturbed after the operation 50, as shown in the resultant tablespace 54, and the original data of table B does not need to be replaced or resumed with itself during the operation 50, as is currently required in the prior art. Furthermore, because the disclosed operation 50 can be performed in a single pass of the tablespace, there is no need to delete rows in a first pass of the tablespace and then load resume rows in a second pass of the tablespace, as seen in the prior art technique of FIG. 3B. Additionally, there is no need to unload data in a first pass of the tablespace and then to load new data and reload unchanging data in a second pass of the tablespace as seen in the prior art technique of FIG. 3C.

In another embodiment, an operation in accordance with the invention allows one or more tables in a multi-table tablespace to be replaced and one or more tables to be resumed in a single pass without modifying the data associated with non-targeted tables residing in that tablespace. In FIG. 4B, for example, the disclosed operation 60 allows table A to be replaced with new data A' and table B to be resumed with table data B' in a single pass of the multi-table tablespace 62 without modifying the data associated with non-targeted table C residing in that tablespace 62. The disclosed operation 60 can replace all rows in the tables targeted to be replaced (e.g., tables A and C in tablespace 62) with new data A' and C', as shown in the resultant tablespace 64. In the same pass of the original tablespace 62, the disclosed operation 60 can also resume new data B' after the existing end 66 of the original tablespace 62 and can leave original table B in the resultant tablespace 64. Of course, in one pass of the original tablespace 62, all tables may be manipulated (replaced or resumed) with the disclosed operation 60.

Figure 5:
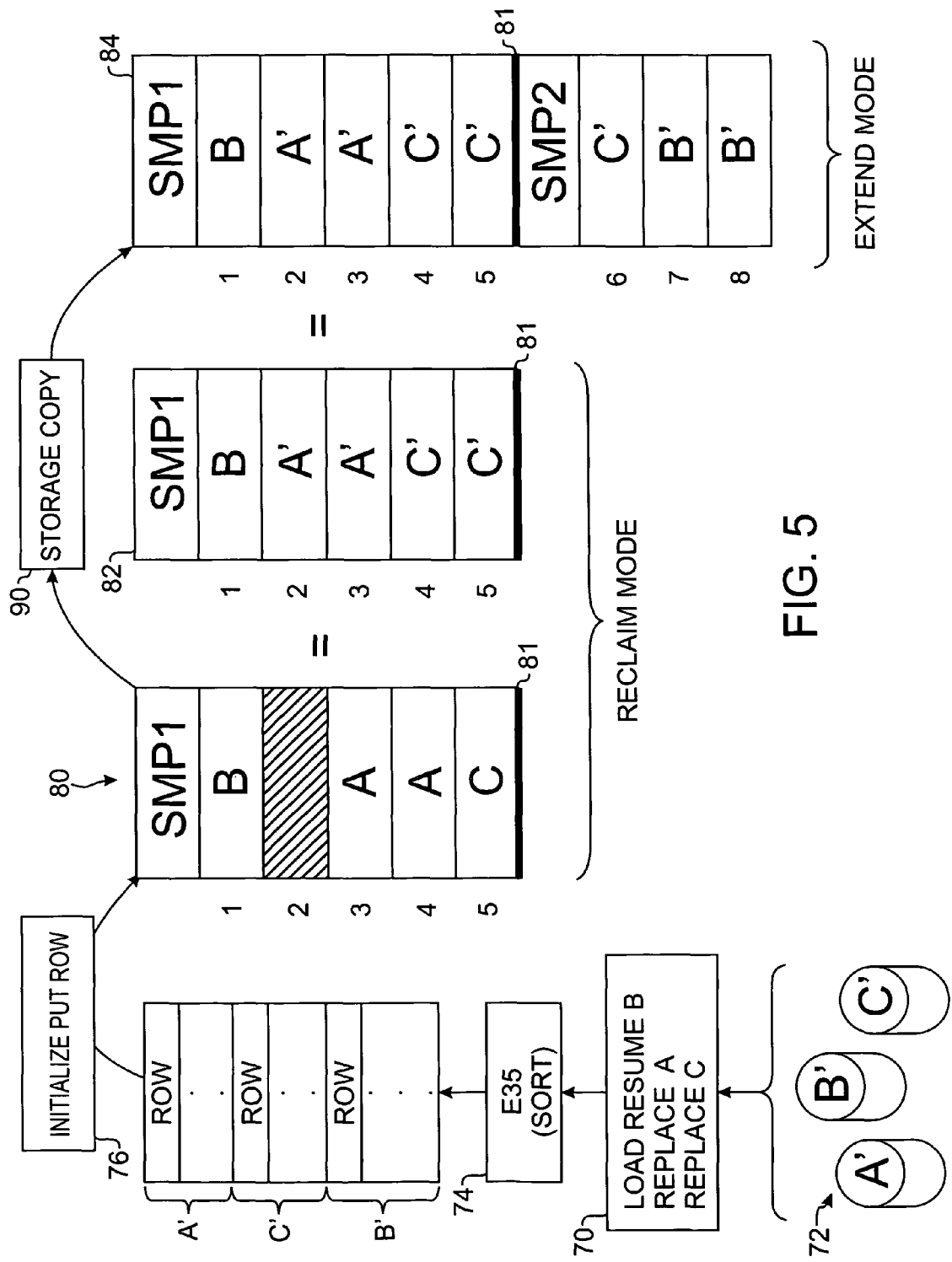
FIG. 5 schematically illustrates an embodiment of the invention having a RECLAIM mode and an EXTEND mode.

Referring to FIG. 5, the load operation 70 according to certain teachings of the present disclosure is schematically illustrated in more detail loading input data 72 into a multi-table tablespace 80 having multiple tables (tables A, B, and C). Because a DB2® environment is assumed in the present embodiment, the multi-table tablespace 80 is a segmented tablespace and will be referred to as such in the discussion that follows. To use the disclosed operation 70, the user specifies a LOAD RESUME operation for the tables targeted to be resumed (e.g., table B) with new table data (e.g., resumed data B). In addition, the user uses the REPLACE option for each table targeted to be replaced (e.g., tables A and C) with new table data (e.g., replacement data A' and C'). Preferably, the records or rows of the input data 72 for a multi-table load are pre-sorted by table ID so that each table will be laid down in as contiguous a manner as possible into the tablespace 80 during the disclosed operation 70. If the run is a mixed run with replaced tables and resumed tables, rows for replaced tables will sort out in front of or before rows for resumed tables. Preferably, an E35 exit sort 74 is used to sort the input data 72.

The disclosed operation 70 initiates PUT ROW operations 76 and executes in two modes, a RECLAIM mode and an EXTEND mode, in a single pass of the tablespace 80. The tablespace 80 includes one or more spacemap pages (e.g., SMP1), and the disclosed operation 70 uses the spacemap pages to drive the operation. One of ordinary skill in the art will recognize that spacemap pages occur at pre-defined intervals in the segmented tablespace 80 and control a specified number of subsequent data structures. In the exemplary segmented tablespace 80 of the assumed DB2® environment, the data structures are defined as segments, which contain a plurality of data pages (not shown). In other relational database environments, a data structure of a multi-table tablespace need not be defined as a segment. In the example of FIG. 5, the segmented tablespace 80 initially has one spacemap page SMP1, five segments (1-5), and an end 81. It will be appreciated that the example segmented tablespace 80 is only illustrative, and a typical segmented tablespace will be larger and more intricate.

In the RECLAIM mode, the disclosed operation makes a storage copy 90 of the first spacemap page SMP1 and scans it for reclaimable segments or data structures. The reclaimable segments include any de-allocated segments or any segments associated with any of the tables targeted to be replaced. For example, the initial tablespace 80 has reclaimable segments that include a de-allocated segment (2) and segments (3-5) associated with tables targeted for replacement (e.g., tables A and C). The disclosed operation then loads the new replacement data (e.g., table data A' and C') in the reclaimable segments (2-5) starting at the beginning of the segmented tablespace 80 so that the new table data 50 for replacement is laid down in a forward moving direction along the segmented tablespace 80. Loading of the replacement data (e.g., table data A' and C') continues until there is no more replacement data or there are no more reclaimable segments (2-5). If some of the reclaimable segments are not filled because there is no more replacement data, then those unfilled reclaimable segments are de-allocated in the spacemap page SMP1. If some of the pages in the reclaimable segment are not filled, then those unfilled pages are marked as empty in the spacemap page SMP1.

When the RECLAIM mode terminates, any original table data not to be replaced (e.g., table data B) in the resultant tablespace 82 is left undisturbed. In addition, any de-allocated segments and segments with old table data for replacement (e.g., segments 2-5) have been loaded with the replacement data (e.g., table data A' and C'). During the RECLAIM mode, the storage copy 90 of the spacemap page is updated to reflect the changes made to the segments (1-5) that it governs. When the RECLAIM mode finishes working within the domain of pages governed by the spacemap page SMP1, the original spacemap page SMP1 is replaced by the storage copy 90.

If the end 81 of the pre-existing tablespace 80 is reached and there is still input data 50 to be loaded, the disclosed operation 70 initiates the EXTEND mode to load any remaining input data 50 into the resultant tablespace 82. In this mode, any remaining input data 50 is loaded into new segments added after the end 81 of the tablespace 82. The new segments are loaded sequentially with new table data after a new spacemap page SMP2 at the end 81 of the tablespace. The remaining input data 50 can include any replacement data (e.g., table data A' and C') that did not fit into the reclaimable segments (2-5) available before the end 81 of the tablespace. In addition, the remaining input data 50 can include any resumed data (e.g., table data B'). For example, new segment 6 includes the overflow of replacement data C' remaining in the input data 50 from the targeted tables that did not fit into the reclaimable segments (2-5) of the original tablespace 80. In addition, new segments 7-8 include resumed data B' for resumed table B. During the EXTEND mode, the second spacemap page SMP2 is updated accordingly.

The disclosed operation offers several potential advantages to users of relational database having segmented tablespaces. First, the disclosed operation can improve performance because the operation deletes old rows and adds new rows to one or more tables all in a single pass of the segmented tablespace. Second, the disclosed operation can ensure accuracy by allowing replacement to occur in a single unit of work. This is an advantage because users are continually concerned about end-users accessing tables between a mass delete and any stopping of the tablespace by a load utility. Third, the disclosed operation can eliminate extra work done by a relational database system to maintain referential integrity (RI) when rows are deleted. The disclosed operation can leave RI connected tables untouched until a new RI checking feature can determine which rows violate RI constraints at load time. This can be useful, for example, when maintaining SAP® segmented tablespaces, which can be quite large and can contain numerous tables with vastly differing sizes and maintenance needs.

Figure 6A:
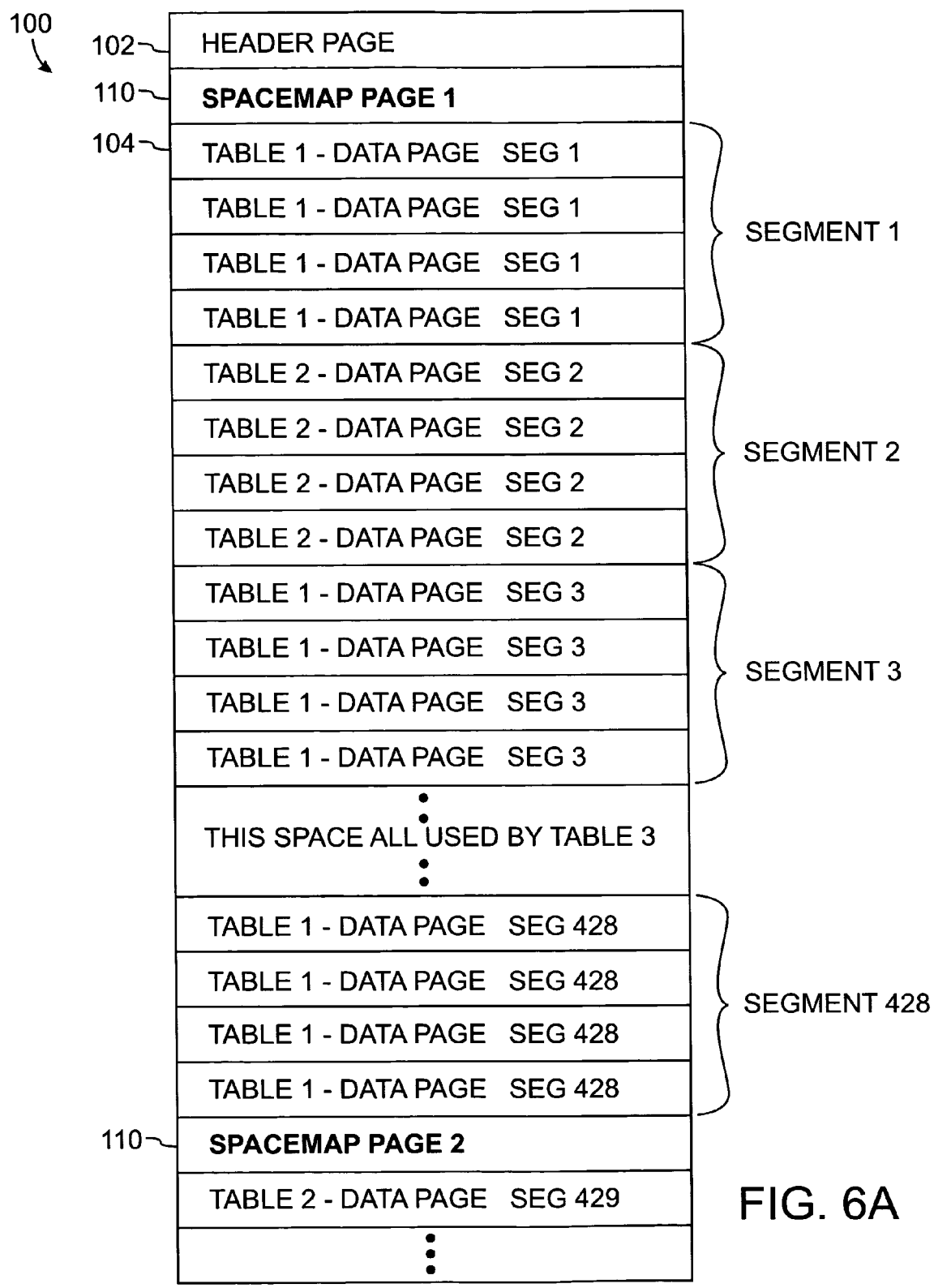
FIG. 6A illustrates an exemplary segmented tablespace having multiple tables.

Given the overview of the disclosed operation and its potential advantages discussed above, further details of the disclosed operation on a segmented tablespace will be discussed below. Referring first to FIG. 6A, an exemplary segmented tablespace 100 having multiple tables (table 1, 2, and 3) for use with the disclosed operation is illustrated. The segmented tablespace 100 includes a header page 102, a plurality of spacemap pages 110, and a plurality of segments (Segments 1, 2, and ... 429 ...). It will be recognized that the header page 102 contains global information about the tablespace 100, such as OBID, storage capacity, row length, segment size, and other metadata about the tablespace 100.

As shown, each segment includes a set number of pages 104 for containing table data. In the present example, the segments include four pages 104, but they can have any other number up to 64 pages per segment in a DB2® environment. In the segmented tablespace 100, each segment can only contain data from one table. Thus, segment 1 includes data for Table 1, segment 2 includes data for Table 2, segment 3 includes data for table 1, segments 4 through 427 include data for Table 3, etc.

As noted previously, the spacemap page 110 is like a table of contents and includes information used by the disclosed operation. The spacemap pages 110 are located at predefined intervals in the tablespace 100. Each spacemap page 110 governs a set number of segments, which in the present example is 428 segments, and contains information about the segments that the spacemap page 110 governs.

In FIG. 6B, portion of an exemplary spacemap page 110 for the segmented tablespace 100 of FIG. 6A is illustrated. The spacemap page 110 includes entries for each segment of the portion of the tablespace governed by the spacemap page 110. For each entry, the spacemap page 100 includes a first column 112 for the next segment in which the table of the current entry is located, a second column 114 for the table ID of the current table in the segment, and a third column 116 for a flag. For example, the flag can indicate whether the segment is de-allocated ("00"), whether the segment is the first segment for that table ("C0"), or whether the segment is allocated ("80"). In addition, the spacemap page 110 includes a plurality of columns 118 for each page of the given segment. These columns 118 typically indicate whether the given page is full, empty, or contains room for a row of data. In a DB2® environment, each of these columns 118 can each include 4 bits of information so that up to sixteen different states could be described for each page of the segment.

Figure 7B:
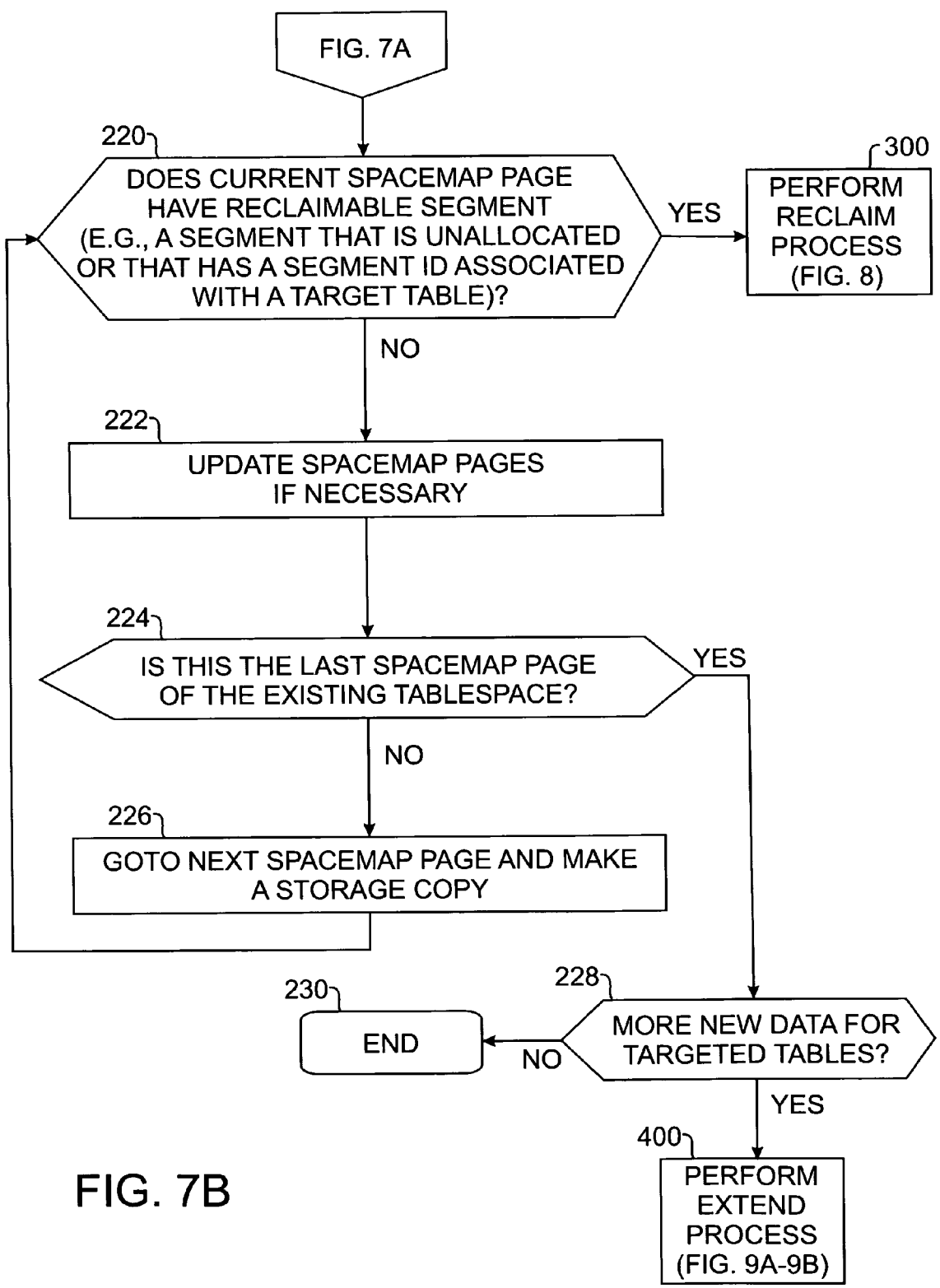

Referring now to FIGS. 7A-7B, one embodiment of a method 200 for performing the disclosed operation is illustrated in flowchart form. Where applicable, the disclosed operation will be discussed in conjunction with the exemplary tablespace 100 and spacemap page 110 of FIGS. 6A-6B. Beginning in FIG. 7A, the disclosed operation is initiated with the required input data, such as the ID for the tablespace, the targeted tables, and the input data (Block 202). The disclosed operation also obtains necessary information from the DBMS catalogue and header of the tablespace, such as OBID, storage capacity, row length, segment size, and other metadata about the tablespace (Block 204). A put row initialization is started and access to the targeted tablespace is locked.

Next, the disclosed operation obtains information from all the spacemap pages in the segmented tablespace (Block 210). This information will be used during further execution of the disclosed operation. During the acts of Block 210, the disclosed operation identifies the last allocated segment in the tablespace (Block 212) and obtains the last page allocated in the tablespace (Block 214). The last segment and page allocated represent the existing end of the tablespace, which is used during the disclosed operation to switch from the RESUME mode to the EXTEND mode. In addition, the disclosed operation identifies the last segment associated with each targeted table (Block 216). For example, in the exemplary spacemap page 110 of FIG. 6B, the next segment column 112 in entry 428 includes "000," which indicates that the given segment ("428") is the last segment associated with the targeted table (table "0001"). The information obtained in Blocks 212 through 216 is used later when the disclosed operation jumps successively through each spacemap page of the tablespace and performs the RECLAIM and EXTEND processes described below.

During execution, it will be appreciated that the disclosed operation will keep track of a number of fields and address of information. For example, some of the fields include the next reclaimed segment to use, the next reclaimed page to use for a data page, a field for sequentially built new pages, the current number of new pages created for a table (either a replaced table or a resumed table), the current segment being filled, the last absolute segment number, a field pointing to the previous page within a segment, etc. In addition, some of the addresses include, for example, the address of the previous spacemap page, the address of the previous entry that is waiting for a pointer, the address of the current segment entry on the current spacemap page, etc. One skilled in the art of programming will appreciate that such fields and addresses will be used, changed, reset, etc. by the disclosed operation as it scans through the spacemap pages and puts rows of input data into pages of the segmented tablespace.

Once the information identified in blocks 210 through 216 is obtained from the catalog, header, and spacemap pages, the disclosed operation performs a single pass through the tablespace to replace data of any tables targeted to be replaced, maintain existing data of any non-targeted tables, and resume data of any tables targeted to be resumed. Referring now to FIG. 7B, the disclosed operation makes a storage copy of the first spacemap page (Block 218). Then, the disclosed operation determines whether the current spacemap page (e.g., the first spacemap page) contains one or more reclaimable segments, which include segments that are de-allocated or segments that have segment IDs associated with any of the tables targeted for replacement (Block 220). For example, in the exemplary spacemap page 110 of FIG. 6B, entry 427 contains information on segment 427 of the tablespace 100 of FIG. 6A. This segment 427 is de-allocated because it contains flag "00" in column 116. In addition, if tables 0001 and 0002 are tables targeted for replacement, the segment for entries 1, 2, 3, and 428 are reclaimable because they contain the segment ID ("0001" and "0002") associated with a table targeted for replacement. Therefore, the disclosed operation would determine that segments 1, 2, 3, 427, and 428 of the tablespace 100 of FIG. 6A are reclaimable segments for the disclosed operation.

If the current spacemap page is identified as containing reclaimable segments in Block 220 of FIG. 7B, the disclosed operation performs the RECLAIM process on the reclaimable segments (Block 300), which is discussed in more detail below with reference to FIG. 8. Briefly, the new input data for the tables targeted for replacement is put into the rows of these reclaimable segments in the RECLAIM process; and the copy of the spacemap page is updated to reflect the addition of the new data.

If the current spacemap page is identified as not containing any reclaimable segments in Block 220 of FIG. 7B, then the spacemap pages are updated if necessary (Block 222). For example, it will be necessary during processing to have two spacemap pages in storage at the same time when the disclosed operation reaches the end of a spacemap. Namely, the previous spacemap page is held in storage until the last entry of the previous spacemap page can be linked to the next reclaimed segment to use.

Next, the disclosed operation determines whether the current spacemap page is the last spacemap page in the existing tablespace (Block 224). If not, the disclosed operation goes to the next spacemap page in the tablespace and makes a storage copy thereof. The disclosed operation then returns to Block 220 to determine whether the next spacemap page has a reclaimable segment (e.g., a de-allocated segments or a segment with an ID for any of the tables targeted for replacement) and repeats the acts in the subsequent Blocks until either there are no more reclaimable segments or no more replacement data.

If the current spacemap page in Block 224 is the last spacemap page of the tablespace (e.g., the operation has reached the end of the existing tablespace), the operation determines whether there is more input data for the targeted tables to be replaced or resumed (Block 228). If there is more input data, the disclosed operation performs the EXTEND process (Block 400), which is described in more detail below with reference to FIGS. 9A-9B. Otherwise, the operation ends because all of the new input data has been put into the existing tablespace and there is no new data to be resumed at the end of the tablespace (Block 230).

Figure 8:
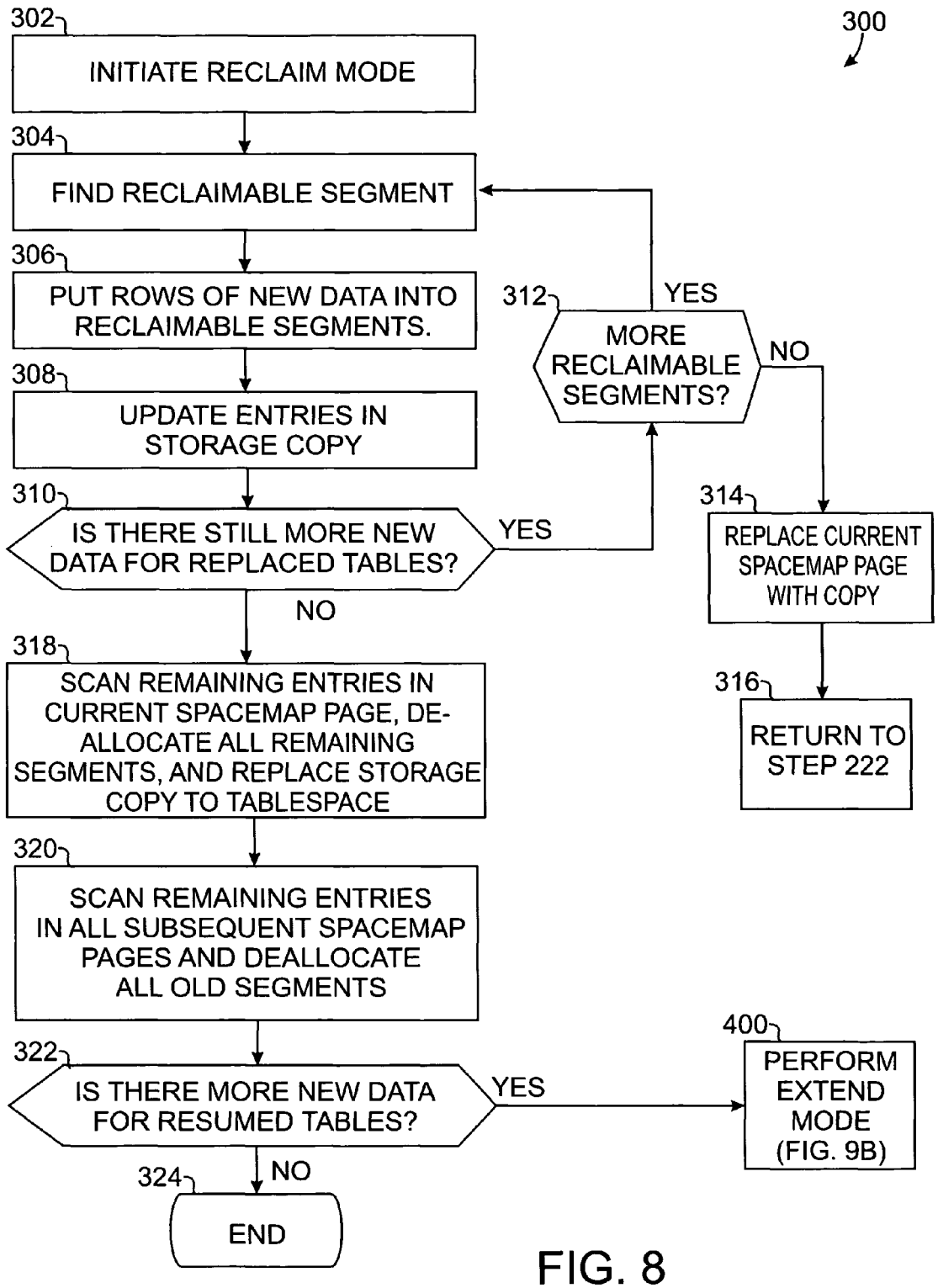
FIG. 8 illustrates, in flowchart form, a method for performing a RECLAIM process in accordance with one embodiment of the invention.

With respect to the acts of Block 300, an embodiment of the RECLAIM process 300 is illustrated in flowchart form of FIG. 8. The disclosed operation initiates the RECLAIM mode for the given interval of the tablespace (e.g., those segments governed by the current spacemap page) (Block 302). Recall that in the acts of Block 220 of FIG. 7B, the disclosed operation determined that the current spacemap page contains a reclaimable segment. Accordingly, the disclosed operation scans through the spacemap page for the reclaimable segments (e.g., those segments that are de-allocated or contain IDs for the tables targeted for replacement) (Block 304). To facilitate processing and searching during the current acts of Block 304, the acts of Block 220 of FIG. 7B may already have flagged reclaimable segments found in the spacemap page.

When a reclaimable segment is found, rows of the new replacement data are put into the pages of the reclaimable segment of the tablespace (Block 304). For example, in the exemplary spacemap page 110 of FIG. 6B, if the reclaimable segments are 1, 2, 3, 427, and 428, the disclosed operation finds the first reclaimable segment, which is segment 1. Then, the operation puts new replacement data into the rows of the pages of the first segment 1 of the tablespace 100 shown in FIG. 6A. As noted previously, however, each segment can only contain data from one table. Therefore, if the disclosed operation were to run out of new input data for one table while filling pages of a segment, the remainder of that segment could not be filled with the input data for another table. Instead, the unfilled pages for the segment would be marked as empty, and the input data for the other table would be placed in an entirely new reclaimable segment.

As each reclaimed segment is filled in the acts of Block 306 of FIG. 8, its entry is updated in the storage copy of the controlling spacemap page (Block 308). If there is more data for replaced tables to be input into the tablespace (Block 310), the operation determines whether there are more reclaimable segments in the spacemap (Block 312). If there is another reclaimable segment, the operation returns to Block 304 and fills this current reclaimable segment. Then, the entry of the storage copy is updated (Block 308). When updating the storage copy, not only is the table ID and other information for the reclaimed segment filled into the storage copy, but the table ID of the current reclaimable segment is chained to the previous segment belonging to the same table (if any) within the storage copy of the spacemap page.

When there are no more reclaimable segments (e.g., the end of the spacemap page is encountered), the current spacemap page is replaced in the tablespace with the storage copy as soon as the last reclaimed entry in the storage copy is linked to the next reclaimed segment of the same table occurring in the next interval of the tablespace (Block 314). For example, in FIG. 6B, if the spacemap page 100 represents the storage copy and the last reclaimed entry is entry "427", then the NEXT SEG column 112 entry "427" is updated to properly reflect what is the next reclaimable segment in the next interval of the tablespace that contains data for the same table being reclaimed. After placing the storage copy of the spacemap page into the tablespace in FIG. 8, the disclosed operation returns to block 222 of FIG. 7B so that the disclosed operation will eventually proceed to the next spacemap page (if any) in the tablespace (Block 316).

While filling the reclaimable segments during the acts of Blocks 304 through 312, it is possible that at some point all the new data for replaced tables will be loaded into the tablespace before the end of the tablespace has been reached. If there is no more new replacement data for replaced tables to be input into the reclaimable segments of the current spacemap in Block 310, the disclosed operation scans the remaining entries in the current spacemap and de-allocates all the remaining reclaimable segments (Block 318). The remaining reclaimable segments that are de-allocated include those segments associated with the tables targeted for replacement, which will not be loaded with new data. The segments associated with other tables not intended to be changed during the operation are not de-allocated. De-allocating a segment is done within the storage copy of the spacemap page using the flag "00," for example. Therefore, this de-allocation process requires no updating to the data pages in the tablespace and may be extremely fast. Finally, in Block 318, the disclosed operation replaces the original spacemap page on the tablespace with the storage copy.

Because there is no more input data for replaced tables to be filled, the operation scans the remaining entries in all the subsequent spacemap pages and de-allocates each of the remaining reclaimable segments belonging to the tables targeted for replacement (Block 320). Finally, the operation determines whether there is any new data for resumed tables to be loaded into the tablespace (Block 322). If not, the operation ends (Block 324). If there is more data for resumed tables, the operation enters the EXTEND mode (Block 350), which is described in more detail below.

Figure 9A:
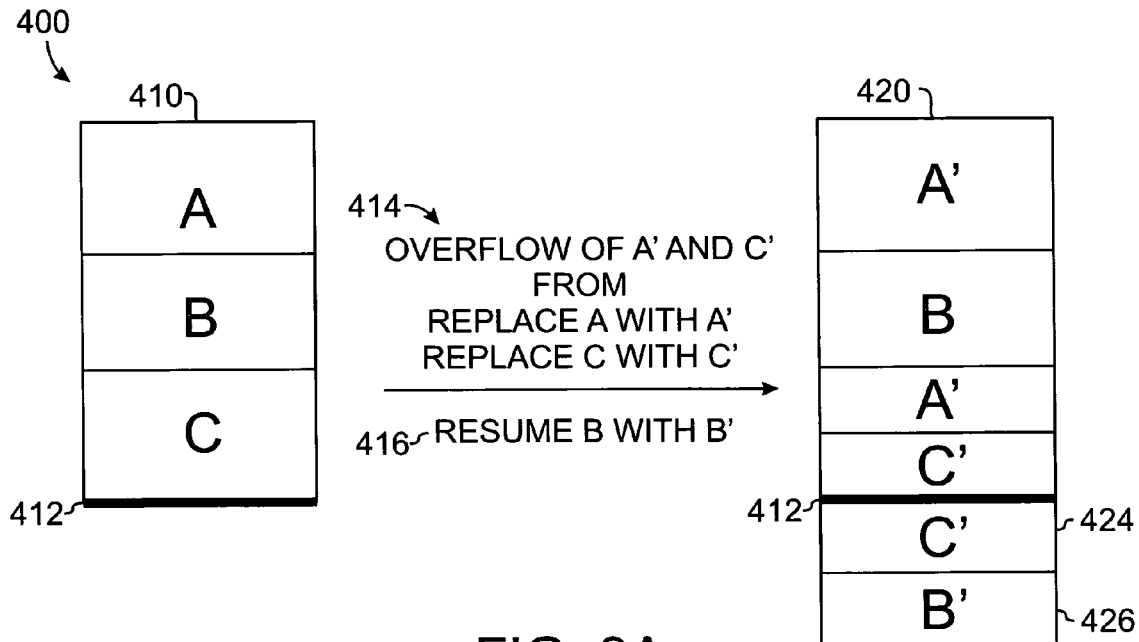
FIGS. 9A-9B schematically show two illustrative scenarios for an EXTEND mode operation in accordance with the invention.
Figure 9B:
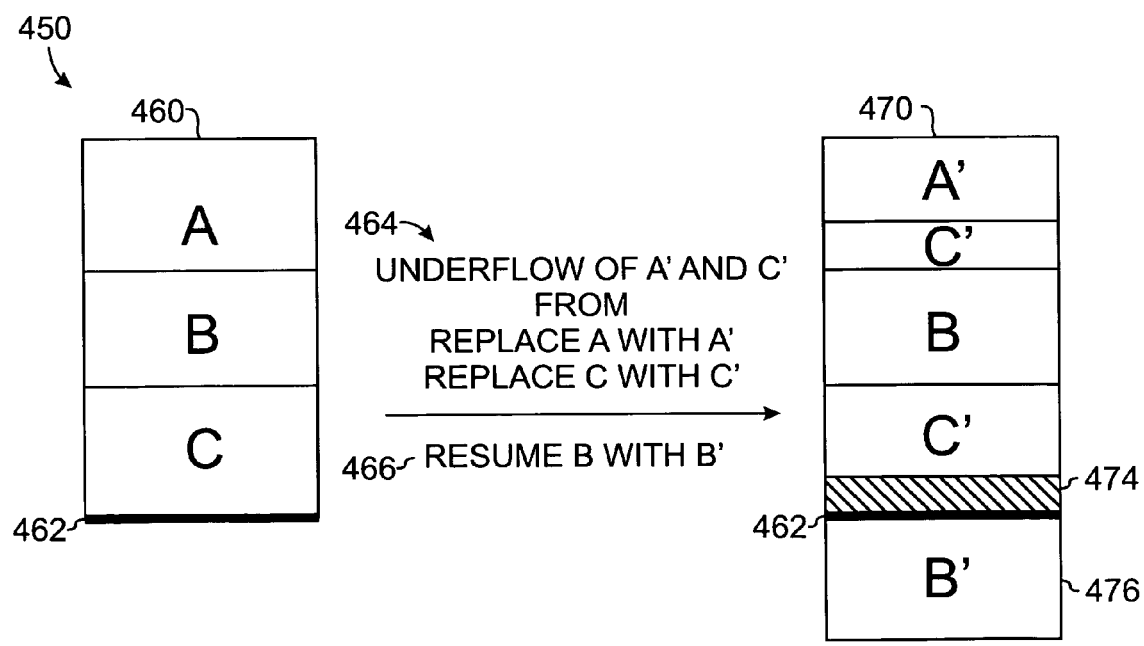

Referring to FIGS. 9A-9B, two scenarios 400 and 450 of an EXTEND mode operation are schematically illustrated. In FIG. 9A, the disclosed operation is shown replacing table A with new table data A', replacing table C with new table data C', and resuming table B with new table data B' on the segmented tablespace 460. After the RECLAIM mode, there may be an overflow 414 of replacement data A' and/or C' that did not fit within the reclaimable segments of the existing tablespace 410. In this scenario 400, the overflow data 414 is loaded into new segments (e.g., segments 424) following the existing end 412 of the original tablespace 410, as shown in the resultant tablespace 420. If there is any new table data being resumed 416, the resumed data (e.g., table data B') is also loaded into new segments (e.g., segments 426) after the existing end 412 of the original tablespace 410, as also shown in the new tablespace 420. Of course, any new spacemap pages (not shown) governing the new segments will be created and added accordingly.

In the other scenario 450 of FIG. 9B, the disclosed operation is again shown replacing table A with new table data A', replacing table C with new table data C', and resuming table B with new table data B' on the segmented tablespace 460. After the RECLAIM mode, however, there was an underflow 464 of new table data A' and C' to fit within the reclaimable segments of the original tablespace 460. Consequently, the reclaimable segments 474 not filled with replacement data have been de-allocated in the resultant tablespace 470. In this scenario 450, only the new table data being resumed 466 (e.g., new table data B') is loaded into new segments (e.g., segments 476) after the existing end 462 of the original tablespace 460, as shown in the new tablespace 470.

Therefore, in the EXTEND mode, any replacement data that did not fit within the reclaimable segments of the existing tablespace and any resumed data are loaded into new segments added to the end of the existing tablespace. In the EXTEND mode, the disclosed operation can follow the same protocols of existing prior art RESUME operations for creating spacemap pages and indexes for the newly added data of the tablespace.

The present disclosure amply illustrates to a computer programmer of ordinary skill how to make and use the disclosed operation for loading data into a segmented tablespace. Therefore, programming the disclosed operation is a routine matter and can be accomplished using many different programming languages and within the context of many different operating systems. Of course, the disclosed techniques would be ultimately coded into a computer program or routines and stored on a computer-readable media, such as a compact disk, a tape, stored in a volatile or non-volatile memory, etc.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A relational database load operation for a segmented tablespace of an IBM Database 2 (DB2) environment, the segmented tablespace having at least a first table and a second table, the load operation comprising:
   receiving a request to replace data in the first table with replacement data and to resume original data in the second table with new data, the first table and the second table being stored in separate segments of the segmented tablespace, and the replacement data differing from the data in the first table;
   creating a copy of original spacemap pages for the tablespace;
   determining reclaimable segments in the tablespace, the reclaimable segments comprising segments assigned to the first table but not segments assigned to the second table;
   replacing the data in the first table by loading the reclaimable segments in the tablespace with the replacement data, while the original data of the second table remains in place in the tablespace without being resumed or replaced, updating the copy of the spacemap pages as the reclaimable segments are loaded; and
   adding the new data to the second table, so the second table includes the original data and the new data,
   wherein the acts of replacing, maintaining, and resuming are performed in a single pass through the segmented tablespace.

2. The load operation of claim 1, wherein the reclaimable segments further comprise a segment that is de-allocated.

3. The load operation of claim 1, wherein replacing the first table with replacement data comprises replacing the original spacemap pages with the copy after the replacing and before adding the new data.

4. The load operation of claim 1, further comprising de-allocating any remaining reclaimable segments not loaded with the replacement data.

5. The load operation of claim 4, wherein de-allocating any remaining reclaimable segments not loaded with replacement data comprises flagging entries of the copy of the spacemap page governing the reclaimable segments as de-allocated, the flagged entries corresponding to the reclaimable segments not loaded with replacement data.

6. The load operation of claim 1, further comprising loading at least some of the replacement data into one or more new segments added after an existing end of the segmented tablespace.

7. The load operation of claim 1, wherein adding the new data comprises loading the new data into one or more new segments added after an existing end of the segmented tablespace.

8. A non-transitory computer-readable medium having instructions to perform a relational database load operation for a segmented tablespace of an IBM Database 2 (DB2) environment, the load operation implementable on a programmable control device and comprising:
   receiving a request to replace data in a first table with replacement data and to resume original data in a second table with new data, the first table and the second table being stored in separate segments of the segmented tablespace, and the replacement data differing in at least one key from the data in the first table;
   creating a copy of original spacemap pages for the tablespace;
   determining reclaimable segments in the tablespace, the reclaimable segments comprising segments assigned to the first table but not segments assigned to the second table;
   loading the reclaimable segments with the replacement data, while the original data of the second table remains in place in the tablespace without being resumed or replaced, updating the copy of the spacemap pages as the reclaimable segments are loaded; and
   adding the new data to the second table, so the second table includes the original data and the new data,
   wherein the acts of loading and adding are performed in a single pass through the segmented tablespace.

9. The computer-readable medium of claim 8, wherein the reclaimable segments further include segments that are de-allocated.

10. The computer-readable medium of claim 8, wherein replacing the first table with replacement data comprises replacing the original spacemap pages with the copy after loading the reclaimable segments and before adding the new data.

11. The computer-readable medium of claim 8, wherein the load operation further comprises de-allocating any remaining reclaimable segments not loaded with replacement data.

12. The computer-readable medium of claim 11, wherein de-allocating any remaining reclaimable segments not loaded with replacement data comprises flagging entries of the copy of the spacemap page governing the reclaimable segments as de-allocated or empty, the flagged entries corresponding to the reclaimable segments not loaded with replacement data.

13. The computer-readable medium of claim 8, wherein the load operation further comprises loading at least some of the replacement data into one or more new segments added after an existing end of the segmented tablespace.

14. The computer-readable medium of claim 8, wherein the load operation further comprises loading at least some of the new data into one or more new segments added after an existing end of the segmented tablespace.

15. A relational database load operation, comprising:
    identifying a first table and a second table in a multi-table tablespace, the first table having first original data and the second table having second original data;
    creating a copy of a map governing data structures for the tablespace;
    identifying reclaimable data structures in the tablespace, reclaimable data structures comprising data structures assigned to the first table and excluding structures assigned to the second table;
    replacing the first original data in the first table with first data by loading the reclaimable data structures with the first data, the first data differing in at least one key from the first original data, updating the copy of the map as the reclaimable data structures are loaded; and
    adding second data to the second table,
    wherein the acts of replacing and resuming are performed in a single pass through the tablespace and without the second original data being replaced or resumed with itself.

16. The load operation of claim 15, wherein the act of searching the tablespace for any reclaimable data structure comprises searching the copy of the map governing the data structures of the tablespace.

17. The load operation of claim 15, wherein the reclaimable data structures further comprise a data structure that is de-allocated.

18. The load operation of claim 15, wherein the act of replacing the first original data in the first table comprises replacing the map with the copy after replacing the first original data and before adding the second data to the second table.

19. The load operation of claim 15, further comprising de-allocating any remaining reclaimable data structures not loaded with the first data.

20. The load operation of claim 19, wherein the act of de-allocating any remaining reclaimable data structures not loaded with the first data comprises flagging entries of the copy of the map governing the reclaimable data structures as de-allocated or empty, the flagged entries corresponding to the reclaimable data structures not loaded with the first data.

21. The load operation of claim 17, wherein the act of replacing the first original data in the first table further comprises loading at least some of the first data into one or more new data structures added after an existing end of the tablespace.

22. The load operation of claim 15, wherein the act of adding the second data to the second table comprises loading the second data into one or more new data structures added after an existing end of the tablespace.

23. A non-transitory computer-readable medium having instructions to perform a relational database load operation implementable on a programmable control device, the load operation comprising:
    identifying a first table and a second table in a multi-table tablespace, the first table having first original data and the second table having second original data;
    creating a copy of a map governing data structures for the tablespace;
    identifying reclaimable data structures in the tablespace, reclaimable data structures comprising data structures assigned to the first table and excluding data structures assigned to the second table;
    replacing the first original data in the first table with first data by loading the reclaimable data structures with the first data, the first data differing in at least one key from the first original data, updating the copy of the map as the reclaimable data structures are loaded with the first data; and
    adding second data to the second table,
    wherein the acts of replacing and adding are performed in a single pass through the tablespace and without the second original data being replaced or resumed with itself.

24. The load operation of claim 23, wherein the act of identifying reclaimable data structures comprises searching the copy of the map governing the data structures of the tablespace.

25. The load operation of claim 23, wherein the reclaimable data structures further comprise a data structure that is de-allocated.

26. The load operation of claim 23, wherein the act of replacing the first original data in the first table comprises replacing the map with the copy after the replacing and before adding the second data to the second table.

27. The load operation of claim 23, further comprising de-allocating any remaining reclaimable data structures not loaded with the first data.

28. The load operation of claim 27, wherein the act of de-allocating any remaining reclaimable data structures not loaded with the first data comprises flagging entries of the copy of the map governing the reclaimable data structures as de-allocated or empty, the flagged entries corresponding to the reclaimable data structures not loaded with the first data.

29. The load operation of claim 23, wherein the act of replacing the first original data further comprises loading at least some of the first data into one or more new data structures added after an existing end of the tablespace.

30. The load operation of claim 23, wherein the act of adding second data to the second table comprises loading the second data into one or more new data structures added after an existing end of the tablespace.

31. A relational database load operation, comprising:
    identifying a first table and a second table in a multi-table tablespace, the second table having second data;
    creating a copy of a map governing data structures for the tablespace;
    identifying reclaimable data structures in the tablespace, reclaimable data structures comprising data structures assigned to the first table but excluding data structures assigned to the second table;
    loading the reclaimable data structures with first data in a reclaim mode that terminates when there are no more reclaimable data structures or there is no unloaded first data, updating the copy of the map as the reclaimable data structures are loaded with the first data;
    determining whether an extend mode is needed; and
    when the extend mode is needed, adding new data structures to the tablespace and loading the new data structures with extended data,
    wherein, the second data is left in place during the reclaim mode and the extend mode.

32. The load operation of claim 31, wherein the act of searching the tablespace for any reclaimable data structure comprises searching the copy of the map governing the data structures of the tablespace.

33. The load operation of claim 31, wherein the reclaimable data structures further comprise a data structure that is de-allocated.

34. The load operation of claim 31, further comprising replacing the map with the copy after the reclaim mode and prior to the extend mode.

35. The load operation of claim 31, further comprising:
determining that no unloaded first data exists; and
responsive to the determining de-allocating any remaining reclaimable data structures not loaded with the first data.

36. The load operation of claim 35, wherein the act of de-allocating any remaining reclaimable data structures not loaded with the first data comprises flagging entries of the copy of the map governing the reclaimable data structures as de-allocated or empty, the flagged entries corresponding to the reclaimable data structures not loaded with the first data.

37. The load operation of claim 31, wherein the act of determining whether the extend mode is needed comprises:
determining that unloaded first data exists; and
loading the unloaded first data into the new data structures as the extended data.

38. The load operation of claim 31, wherein the act of determining whether the extend mode is needed comprises:
determining that resume data for the second table exists; and
resuming the second table with the resume data during the extend mode, the extended data comprising the resume data.

39. The load operation of claim 31, wherein the extend mode is needed when new data for the second table is to be added as the extended data or when there is unloaded first data to be loaded as the extended data.

40. A non-transitory computer-readable medium having instructions to perform a relational database load operation implementable on a programmable control device, the load operation comprising:
identifying a first table and a second table in a multi-table tablespace, the second table having original second data;
creating a copy of a map governing data structures for the tablespace;
identifying reclaimable data structures in the tablespace, reclaimable data structures comprising data structures assigned to the first table but excluding data structures assigned to the second table;
loading the reclaimable data structures with first data in a reclaim mode that terminates when there are no more reclaimable data structures or there is no unloaded first data, updating the copy of the map as the reclaimable data structures are loaded with the first data;
determining whether an extend mode is needed; and
when the extend mode is needed, adding new data structures to the tablespace and loading the new data structures with extended data,
wherein, the original second data is left in place during the reclaim mode and the extend mode.

41. The load operation of claim 40, wherein the act of identifying reclaimable data structures comprises searching the copy of the map governing the data structures of the tablespace.

42. The load operation of claim 40, wherein the reclaimable data structure further comprises a data structure that is de-allocated.

43. The load operation of claim 40, further comprising replacing the map with the copy after the reclaim mode and prior to the extend mode.

44. The load operation of claim 40, further comprising:
determining that no unloaded first data exists; and
responsive to the determining de-allocating any remaining reclaimable data structures not loaded with the first data.

45. The load operation of claim 44, wherein the act of de-allocating any remaining reclaimable data structures not loaded with the first data comprises
flagging entries of the copy of the map governing the reclaimable data structures as de-allocated or empty, the flagged entries corresponding to the reclaimable data structures not loaded with the first data.

46. The load operation of claim 40, wherein the act of determining whether the extend mode is needed comprises:
determining that unloaded first data exists; and
loading the unloaded first data into the new data structures as the extended data.

47. The load operation of claim 40, wherein the act of determining whether the extend mode is needed comprises:
determining that resume data for the second table exists; and
resuming the second table with the resume data during the extend mode, the extended data comprising the resume data.

48. The load operation of claim 40, wherein the extend mode is needed when new data for the second table is to be added as the extended data or when there is unloaded first data to be loaded as the extended data.

49. A relational database management system for a computer system, the computer system having a central processing unit operatively coupled to memory, the memory storing a multi-table tablespace having a plurality of tables, the management system comprising:
a load operation implementable on the central processing unit for performing instructions, the instructions comprising:
identifying a first table and a second table in the multi-table tablespace, the second table having second original data;
creating a copy of a map governing data structures for the tablespace;
identifying reclaimable data structures in the tablespace, reclaimable data structures comprising data structures assigned to the first table but excluding data structures assigned to the second table;
replacing data in the first table by loading the reclaimable data structures with first data in a reclaim mode that terminates when there are no more reclaimable data structures, updating the copy of the map as the reclaimable data structures are loaded with the first data;
determining that first data remains to be loaded in the first table;
adding new data structures in an extend mode; and
loading the new data structures with the remaining first data,
wherein the second original data is left in place during the reclaim mode and the extend mode.

50. The management system of claim 49, wherein identifying the reclaimable data structures comprises searching the copy of the map governing the data structures of the tablespace.

51. The management system of claim 49, wherein the reclaimable data structure further comprises a data structure that is de-allocated.

52. The management system of claim 49, further comprising replacing the map with the copy after the reclaim mode and prior to the extend mode.

53. The management system of claim 49, wherein loading the reclaimable data structures further includes de-allocating any remaining reclaimable data structures not loaded with the first data.

54. The management system of claim 53, wherein de-allocating any remaining reclaimable data structures not loaded with replacement data comprises flagging entries of the copy of the map governing the data structures as de-allocated or empty, the flagged entries corresponding to the reclaimable data structures not loaded with replacement data.

\* \* \* \* \*